United States Patent
Stanhope

(10) Patent No.: US 10,662,827 B2
(45) Date of Patent: May 26, 2020

(54) CENTER BOLT OIL CONTROL VALVE TO CONTROL A CAM PHASER WITH A CALIBRATION CAP HAVING A PRESSURE CHECK VALVE AND FILTER

(71) Applicant: ECO Holding 1 GmbH, Marktheidenfeld (DE)

(72) Inventor: Daniel Stanhope, Nunica, MI (US)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 16/119,376

(22) Filed: Aug. 31, 2018

(65) Prior Publication Data
US 2019/0257222 A1    Aug. 22, 2019

Related U.S. Application Data

(60) Provisional application No. 62/633,180, filed on Feb. 21, 2018.

(51) Int. Cl.
*F01L 1/344* (2006.01)
*G05D 7/06* (2006.01)

(52) U.S. Cl.
CPC .......... *F01L 1/3442* (2013.01); *G05D 7/0647* (2013.01); *F01L 2001/3444* (2013.01); *F01L 2001/34426* (2013.01); *F01L 2001/34433* (2013.01)

(58) Field of Classification Search
CPC ..... F01L 2001/34426; F01L 2001/3443; F01L 2001/34433; F01L 1/46

USPC ....................................................... 123/90.15
See application file for complete search history.

(56) References Cited

U.S. PATENT DOCUMENTS

| 2007/0056540 | A1* | 3/2007 | Hoppe | F01L 1/3442 123/90.17 |
| 2012/0145105 | A1* | 6/2012 | Bayrakdar | F01L 1/3442 123/90.17 |
| 2016/0010515 | A1* | 1/2016 | Snyder | F01L 1/3442 123/90.15 |
| 2017/0260883 | A1* | 9/2017 | Benischek | F01L 1/3442 |
| 2018/0058272 | A1* | 3/2018 | Haltiner, Jr. | F01L 1/3442 |
| 2018/0135471 | A1* | 5/2018 | Kajita | F01L 1/047 |

FOREIGN PATENT DOCUMENTS

WO  WO-2006127347 A1 * 11/2006 ............ F01L 1/3442

* cited by examiner

*Primary Examiner* — Jorge L Leon, Jr.
(74) *Attorney, Agent, or Firm* — Von Rohrscheidt Patents

(57) ABSTRACT

A center bolt oil control valve including a valve housing, a piston within the valve housing, and a calibration cap having at least a pressure check valve and filter. The calibration cap is located within the valve housing and is extending out an end of the valve housing. A supply pressure port may be placed in the valve housing, wherein the supply pressure port supplies a hydraulic fluid to ports in the valve housing depending on a position of the piston. The valve housing includes a threaded portion and is fastened to a cam nose with the threaded portion, wherein a supply pressure port of the cam nose is adjacent the threaded portion. This valve provides improved design flexibility, especially for axial constrained applications.

15 Claims, 3 Drawing Sheets

CENTER BOLT OIL CONTROL VALVE TO CONTROL A CAM PHASER WITH A CALIBRATION CAP HAVING A PRESSURE CHECK VALVE AND FILTER

RELATED APPLICATIONS

This application claims priority from, and incorporates by reference, U.S. provisional application Ser. No. 62/633,180, filed Feb. 21, 2018.

FIELD OF THE INVENTION

The invention relates to an oil control valve for a cam phaser of an internal combustion engine where the piston is positioned by an external actuator and the oil control valve includes a calibration cap having at least a supply pressure check valve and filter.

BACKGROUND OF THE INVENTION

Hydraulic valves for cam phasers for internal combustion engines are well known in the art. The hydraulic valve includes a piston that is axially movable in a valve housing of the hydraulic valve and that controls a hydraulic loading of the cam phaser. Desired hydraulic valves come in many different configurations and new original designs are often required for each new desired application. For example, the valve housing typically houses a supply pressure check valve and filter. Unfortunately, housing the supply pressure check valve and filter in the valve housing inhibits packaging in axially constrained applications. Specifically, where a short valve housing is required or advantageous from customer packaging, such designs limit where the supply port, check valve, and filter may be placed. Accordingly, there is a need in the art for a design that overcomes the above problems.

BRIEF SUMMARY OF THE INVENTION

An object of the invention is to provide a center bolt oil control valve including a valve housing, a piston within the valve housing, and a calibration cap having at least a pressure check valve and filter. The calibration cap is located within the valve housing and is extending out an end of the valve housing, The center bolt oil control valve may be pressure balanced. The valve may further include a supply pressure port in the valve housing, wherein the supply pressure port supplies a hydraulic fluid to ports in the valve housing depending on a position of the piston. The valve housing may include a threaded portion and is fastened to a camshaft nose with the threaded portion, wherein a supply pressure port of the camshaft nose is adjacent the threaded portion. The valve housing may be a short center bolt. Short center bolts may have a length of no more than 40 mm. The center bolt oil control valve oil may provide pressure control, cam torque recirculation, or a hybrid of pressure control and cam torque recirculation. The valve may further include an advancing port located in the valve housing and a retarding port located in the valve housing, wherein the piston travels within the valve housing such that there is a starting position, a middle position, and an end position, When the piston is in the starting position, a hydraulic fluid may flow from the advancing port to the retarding port. When the piston is in the ending position, a hydraulic fluid may flow from the retarding port to the advancing port. When the piston is in the middle position, a hydraulic fluid flow between the advancing port and the retarding port may be inhibited.

BRIEF DESCRIPTION OF THE DRAWINGS

Other advantages, features and details of the invention can be derived from the subsequent description of advantageous embodiments and from the drawing figures. The features and feature combinations recited in the preceding description and the features and feature combinations recited and shown individually in the figure description and in the figures are not only usable in the respectively recited combination but also in other combinations or by themselves without departing from the spirit and scope of the invention. Identical or functionally equivalent elements are designated with identical reference numerals. For reasons of clarity it is possible that elements are not designated with reference numerals in all figures without losing their association, wherein.

DETAILED DESCRIPTION OF THE INVENTION

The invention relates to an oil control valve for a cam phaser of an internal combustion engine where the piston is positioned by an external actuator and the oil control valve includes a calibration cap having at least a supply pressure check valve and filter. Advantageously the oil control valve is pressure balanced. Advantageously the oil control valve includes a check valve tube and a check valve disc provided in one piece.

The hollow piston is pressure balanced since the circular surface is at least nearly identical to the annular surface. The hollow piston being pressure balanced, also known as pressure compensated, is further discussed in U.S. Pat. No. 9,739,182, which is incorporated herein in its entirety by this reference.

Figure 1:
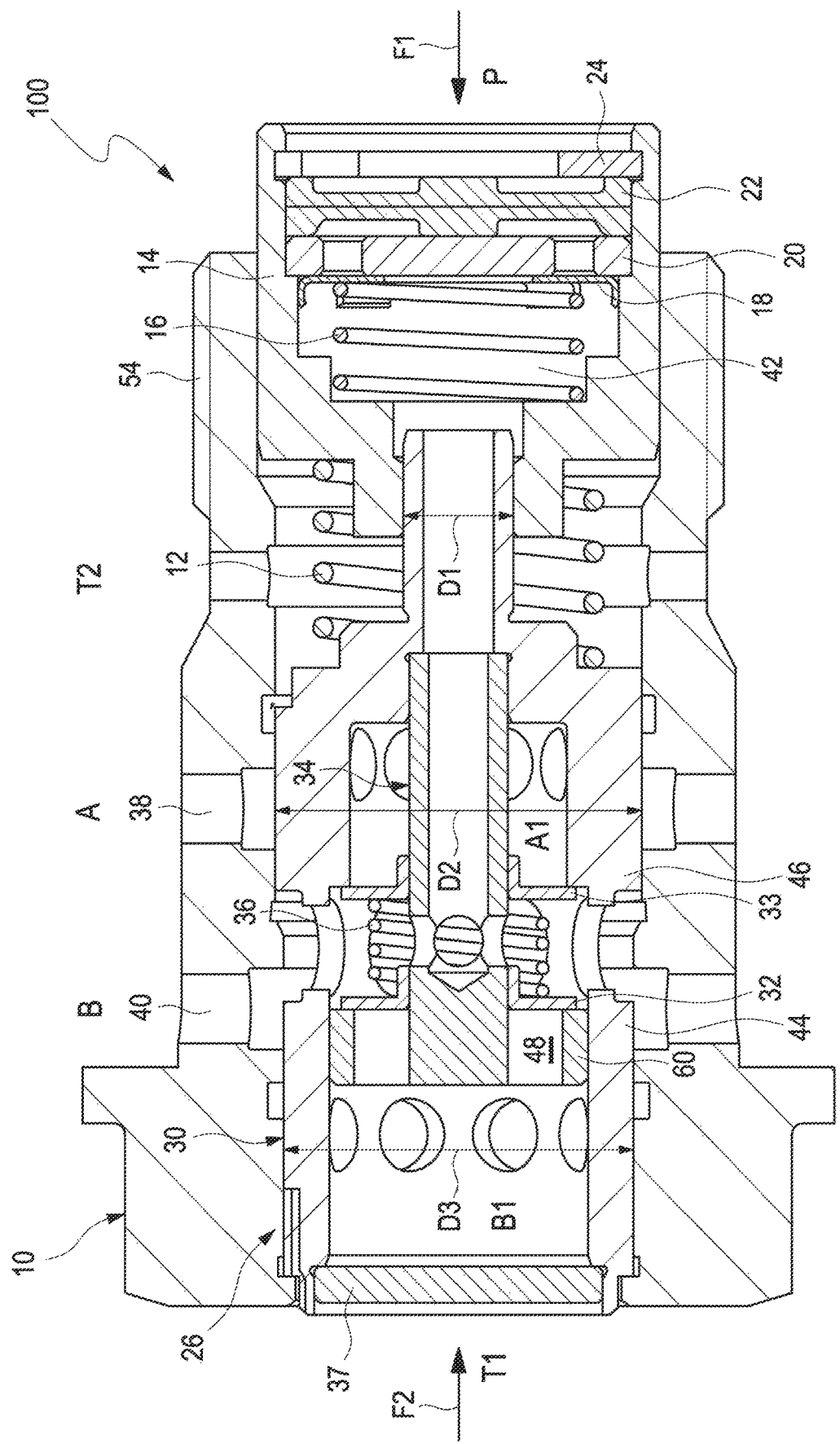
FIG. 1 illustrates an embodiment of a center bolt oil control valve for a cam phaser of an internal combustion engine.

FIG. 1 illustrates an assembled view of an oil control valve 100 for a cam phaser of an internal combustion engine. The oil control valve includes a central valve housing 10, a spring 12, a calibration cap 14, a spring 16, a check valve 18, a flow disc 20, a supply filter 22, a snap ring 24, a piston assembly 26, a piston 30, first check valve 32, second check valve 33, a check valve tube 34 and a spring 36. The plate check valves 32, 33 are axially arranged in the piston 30 and have equal opening directions, opposite opening directions are possible alternatively. They abut on a recess of the piston 30 respectively on check valve disc 60 of the check valve tube 34. In order to hydraulically supply the cam phaser plural connections A, B, P, T1 (located in the center of the valve housing 10 (so-called central bolt or central feed bolt) on the left side), T2 (located on the right side) are provided. A disc 37 closes the left end of the piston tightly.

Figure 2:
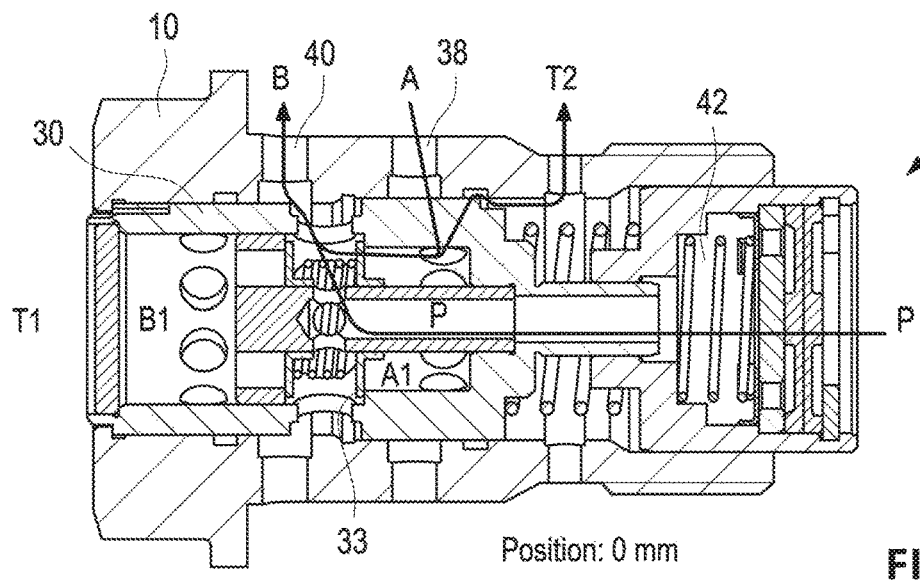
FIG. 2 illustrates the center bolt oil control valve with 0 mm of piston travel (starting position)

FIG. 2 illustrates the starting position of the piston 30 oil control valve 100 with 0 mm of piston travel and the corresponding fluid connections. In the starting position, the retarding port 40 is connected to supply P and a pressure supply port 42 in the valve housing 10 and the second plate check valve 33 results in the cam torque recirculation of oil from an advancing port 38 associated with connection A to a retarding port 40 associate with connection B. The advancing port 38 is also connected to tank port T2.

Figure 3:
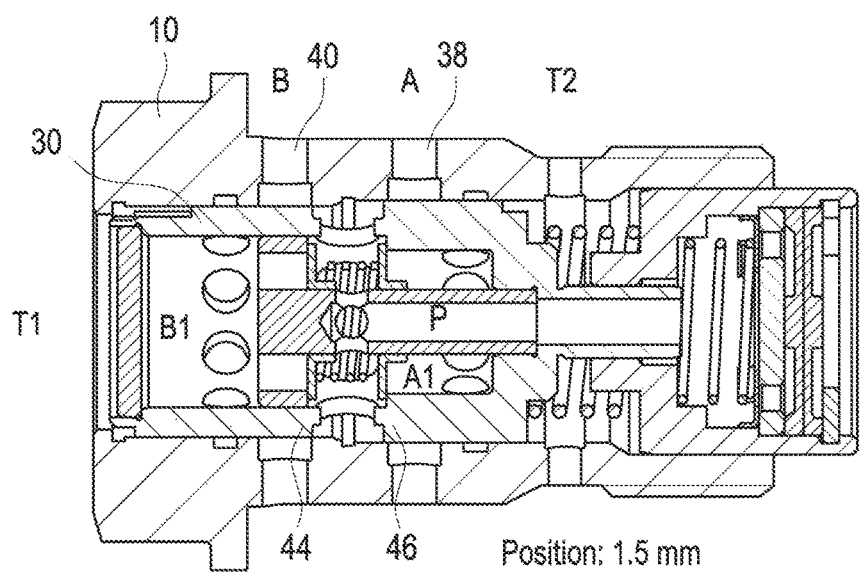
FIG. 3 illustrates the center bolt oil control valve with 1.5 mm of piston travel (middle or hold position)

FIG. 3 illustrates the center bolt oil control valve 100 with 1.5 mm of piston travel (middle or hold position). In middle position, the piston lands 44, 46 block A and B to hold the cam phaser position. There is no recirculation or exhaust in the middle or hold position. The connection A is in communication with the advancing port 38 and the connection B is in communication with a retarding port 40. The connection P is in communication with the supply port 42 of the valve housing 10.

Figure 4:
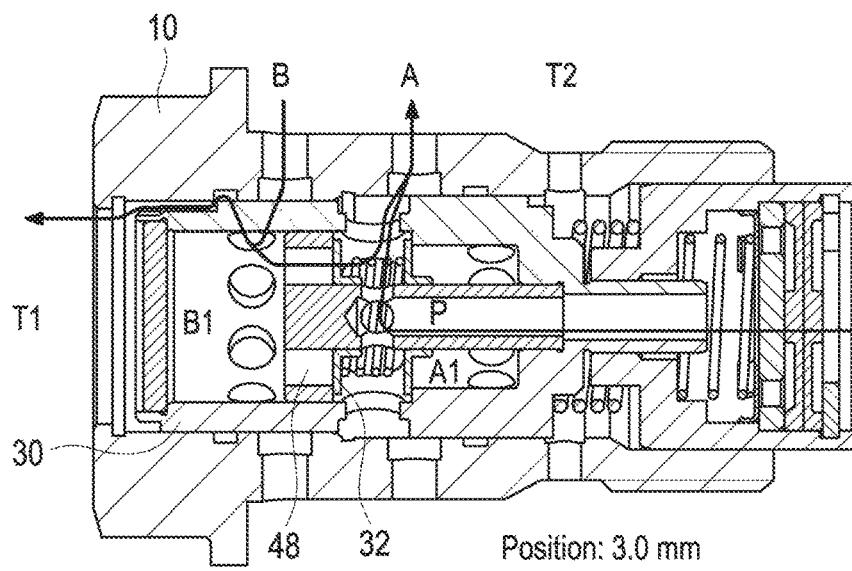
FIG. 4 illustrates the center bolt oil control valve with 3 mm of piston travel (end position)

FIG. 4 illustrates the center bolt oil control valve 100 with 3 mm of piston travel (end position). In the end position, the advancing port 38 is connected to supply P and the supply port 42 and the first plate check valve 32 results in the cam torque recirculation of oil from B to A. The center bolt oil control valve 100 also includes an advancing connection passage 48. The first check valve 32 has a valve seat in the advancing connection passage 48. The retarding port 40 is also connected to tank port T1.

Figure 5:
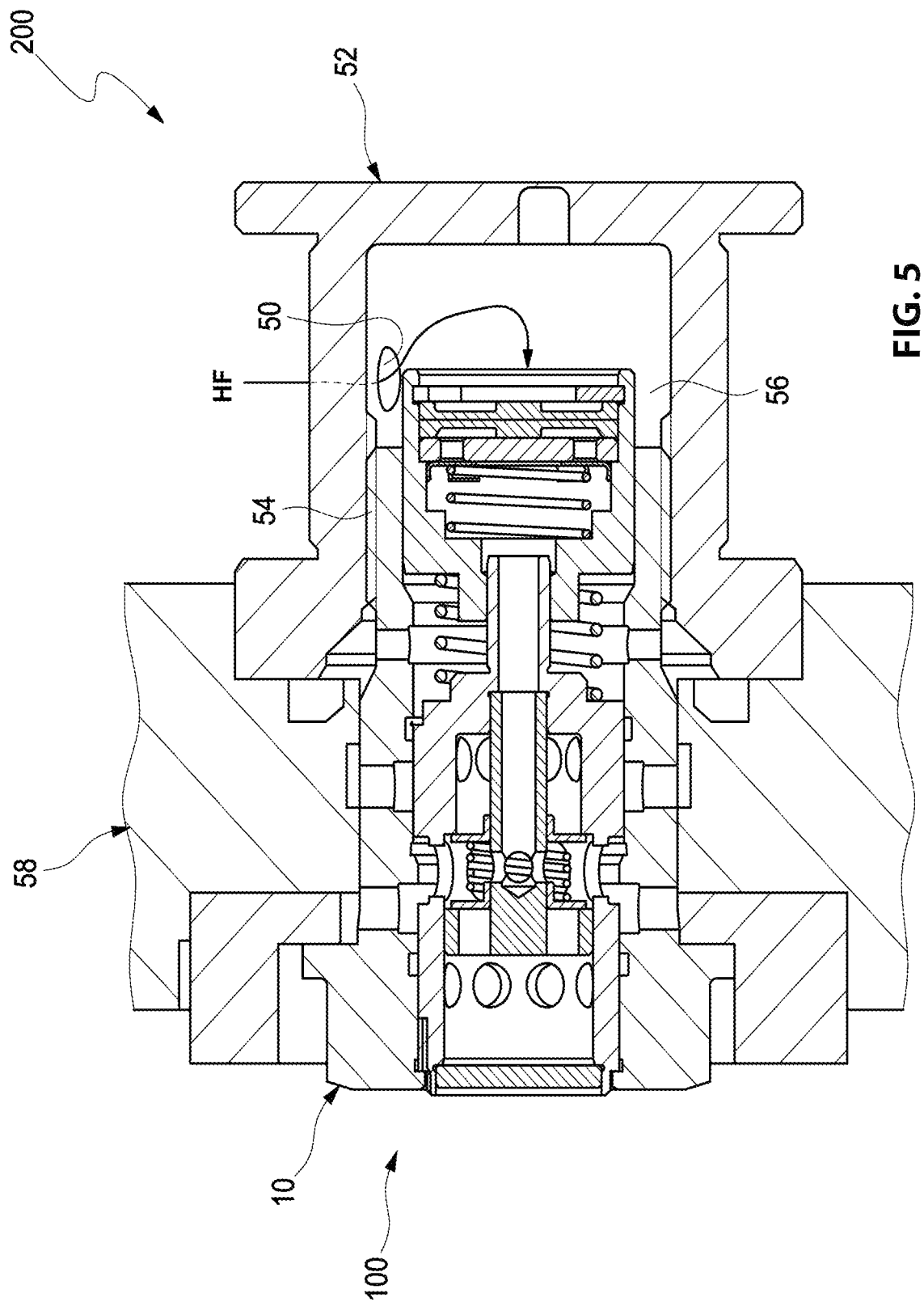
FIG. 5 illustrates an assembly comprising the center bolt control valve, a camshaft nose and a cam phaser.

FIG. 5 illustrates an assembly 200 comprising the center bolt control valve 100, a camshaft nose 52 and a cam phaser 58. Hydraulic fluid HF flows from a supply pressure port 50 located in the camshaft nose 52, in which the center bolt control valve 100 is fastened, towards the calibration cap 14. The calibration cap 14 houses the supply pressure check valve 18, the flow disc 20 and the supply filter 22. The hydraulic fluid HF enters the end of the center bolt control valve 100 under pressure from the supply port 50 of the camshaft nose 52. The resultant pressure force is balanced by the differential diameters D1, D2, D3 of the piston 30. The hollow piston 30 has, adjacently, following said first outside diameter D3 a lateral surface with a large outside diameter D2 and a lateral surface with a small outside diameter D1. A supply pressure introduced into the supply port 42 is applied firstly to a projected circular surface, which is formed by the small outside diameter D1 of the piston 30, such that a force F1 is effective in an axial direction. The supply pressure is applied secondly to a projected annular surface which is formed from the large outside diameter D2 minus the first outside diameter D3 of the piston 30, such that a force F2 is effective in an opposite axial direction. The hollow piston 30 is pressure balanced since the circular surface D1 is at least nearly identical to the annular surface (large outside diameter D2 minus the first outside diameter D3).

Prior art control valves located the supply pressure check valve and filter within the valve housing 10 instead of the calibration cap 14. Locating the supply pressure check valve 18, the flow disc 20 and the filter 22 within calibration cap 14 instead of the valve housing 10 enables installation in a short axial package where the supply port 50 in the cam shaft (camshaft nose 52) is not blocked as has occurred with the prior art designs.

The embodiments of the present invention provide numerous advantages as compared to the prior art. For example, the present invention enables packaging in axially constrained applications. More specifically, where a short valve housing 10 (central bolt) is required due to customer packaging, the present invention allows the supply port 50 of the camshaft nose 52 to be close to a threaded portion 54 of the valve housing 10 while allowing space for a filter 22 and check valve 18 without lengthening the valve housing 10. The hydraulic fluid can flow through an annular space 56 between the camshaft nose 52 and the calibration cap 14.

The short valve housing has a length of no shorter than 32 mm, but it is no longer than 40 mm. Known central feed bolts (valve housings) with no calibration cap 14 extending out the front are no shorter than 40.00 mm but no longer than 50.00 mm usually.

The present invention also improves flexibility in the design of center bolt control valves. For example, the present invention can be implemented in many end feed oil control valves that may be used for oil pressure control, cam torque recirculation or both.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

What is claimed is:

1. A center bolt oil control valve, comprising:
   a valve housing;
   a piston arranged within the valve housing and configured to move in an axial direction of the valve housing;
   a spring within the valve housing that imparts a predetermined axial preload upon the piston with a first end of the spring; and
   a calibration cap having at least a pressure check valve and filter,
   wherein the calibration cap is located within the valve housing and partially extends out of an end of the valve housing,
   wherein the calibration cap contacts a second end of the spring and is inserted into the valve housing at a variable insertion depth that is sufficient to impart the predetermined axial preload upon the spring.

2. The center bolt oil control valve according to claim 1, wherein the center bolt oil control valve is pressure balanced.

3. The center bolt oil control valve according to claim 1, further comprising:
   a supply pressure port in the valve housing,
   wherein the supply pressure port supplies a hydraulic fluid to ports in the valve housing depending on a position of the piston.

4. The center bolt oil control valve according to claim 3, wherein the valve housing includes a threaded portion and is fastened to a camshaft nose with the threaded portion, and
   wherein a supply pressure port of the camshaft nose is adjacent the threaded portion.

5. The center bolt oil control valve according to claim 1, wherein the valve housing has a length less than or equal to 40 mm.

6. The center bolt oil control valve according to claim 1, wherein the center bolt oil control valve provides pressure control.

7. The center bolt oil control valve according to claim 1, wherein the center bolt oil control valve provides cam torque recirculation.

8. The center bolt oil control valve according to claim 1, wherein the center bolt oil control valve provides a hybrid of pressure control and cam torque recirculation.

9. The center bolt oil control valve according to claim 1, further comprising: an advancing port located in the valve housing; and a retarding port located in the valve housing, wherein the piston travels within the valve housing such that there is a starting position, a middle position, and an end position.

10. The center bolt oil control valve according to claim 9, wherein when the piston is in the starting position, a hydraulic fluid flows from the advancing port to the retarding port.

11. The center bolt oil control valve according to claim 9, wherein a hydraulic fluid flows from the retarding port to the advancing port when the piston is in the end position.

12. The center bolt oil control valve according to claim 9, wherein hydraulic fluid flow between the advancing port and the retarding port is inhibited when the piston is in the middle position.

13. A center bolt oil control valve comprising:
   a valve housing;
   a piston arranged within the valve housing and configured to move in an axial direction of the valve housing;
   a spring within the valve housing that imparts a predetermined axial preload upon the piston with a first end of the spring;
   a calibration cap having a pressure check valve and filter;
   a supply pressure port in the valve housing;
   an advancing port located in the valve housing; and
   a retarding port located in the valve housing,
   wherein the calibration cap is located within the valve housing and partially extends out of an end of the valve housing,
   wherein the calibration cap contacts a second end of the spring and is inserted into the valve housing at a variable insertion depth that is sufficient to impart the predetermined axial preload upon the spring,
   wherein the supply pressure port supplies a hydraulic fluid to the advancing port or to the retarding port depending on a position of the piston,
   wherein the valve housing includes a threaded portion and is fastened to a camshaft nose with the threaded portion,
   wherein a supply pressure port of the camshaft nose is adjacent the threaded portion,
   wherein the piston travels within the valve housing such that there is a starting position, a middle position, and an end position,
   wherein the hydraulic fluid flows from the advancing port to the retarding port when the piston is in the starting position,
   wherein the hydraulic fluid flows from the retarding port to the advancing port when the piston is in the end position, and
   wherein hydraulic fluid flow between the advancing port and the retarding port is inhibited when the piston is in the middle position.

14. The center bolt oil control valve according to claim 13, wherein the center bolt oil control valve is pressure balanced.

15. The center bolt oil control valve according to claim 13, wherein the valve housing has a length less than or equal to 40 mm.

* * * * *